United States Patent
Pampuch et al.

(10) Patent No.: US 9,507,062 B2
(45) Date of Patent: Nov. 29, 2016

(54) SOLID BODY JOINING OF A CARRIER BODY AND A COVER LAYER, PARTICULARLY BY ANODIC BONDING

(71) Applicant: Berliner Glas KGaA Herbert Kubatz GmbH & Co., Berlin (DE)

(72) Inventors: Carsten Pampuch, Berlin (DE); Khaldoun Halalo, Zeuthen (DE); Volker Schmidt, Berlin (DE)

(73) Assignee: Berliner Glas KGaA Herbert Kubatz GmbH & Co., Berlin (DE)

(*) Notice: Subject to any disclaimer, the term of this patent is extended or adjusted under 35 U.S.C. 154(b) by 70 days.

(21) Appl. No.: 14/547,318

(22) Filed: Nov. 19, 2014

(65) Prior Publication Data

US 2015/0140276 A1 May 21, 2015

(30) Foreign Application Priority Data

Nov. 20, 2013 (DE) .................. 10 2013 019 434

(51) Int. Cl.
*H05K 3/00* (2006.01)
*C03C 15/00* (2006.01)
(Continued)

(52) U.S. Cl.
CPC ............ *G02B 5/10* (2013.01); *B32B 17/00* (2013.01); *B32B 17/06* (2013.01); *B32B 18/00* (2013.01); *B32B 38/0012* (2013.01); *B32B 38/10* (2013.01); *B32B 38/1866* (2013.01); *C04B 37/042* (2013.01); *C04B 37/045* (2013.01); *B32B 37/10* (2013.01); *B32B 38/0008* (2013.01); *B32B 2309/02* (2013.01); *B32B 2315/02* (2013.01); *B32B 2551/00* (2013.01); *C04B 2237/062* (2013.01); *C04B 2237/365* (2013.01); *C04B 2237/52* (2013.01); *C04B 2237/54* (2013.01); *C04B 2237/70* (2013.01); *C04B 2237/76* (2013.01); *C04B 2237/84* (2013.01); *Y10T 156/10* (2015.01); *Y10T 156/1028* (2015.01); *Y10T 428/24521* (2015.01)

(58) Field of Classification Search
None
See application file for complete search history.

(56) References Cited

U.S. PATENT DOCUMENTS

| 5,827,343 A | 10/1998 | Engelke et al. |
| 8,277,086 B2 | 10/2012 | Heitmann |

(Continued)

FOREIGN PATENT DOCUMENTS

| DE | 10200243 A1 | 7/2003 |
| DE | 202009016032 U1 | 5/2010 |

(Continued)

OTHER PUBLICATIONS

English-language abstract of JP2006181906 (2006).
(Continued)

*Primary Examiner* — Shamim Ahmed
(74) *Attorney, Agent, or Firm* — Caesar Rivise, PC

(57) ABSTRACT

In a method for solid body joining of a carrier body (10) and a cover layer (20), in particular by anodic bonding, the cover layer (20) is pressed with a pressing force against a curved carrier body surface (11), wherein the pressing force during the solid body joining is distributed by way of a pressure intermediary device (30) areally and simultaneously over the whole cover layer (20) and is directed perpendicularly to the curvature of the carrier body surface (11). A composite component comprising a carrier body (10) and a cover layer

(20) is also disclosed, wherein a curved areal joining region (13) is formed between a cover layer surface (21) and a carrier body surface (11).

11 Claims, 3 Drawing Sheets

(51) Int. Cl.
*B01F 11/00* (2006.01)
*G02B 5/10* (2006.01)
*B32B 17/06* (2006.01)
*B32B 18/00* (2006.01)
*B32B 38/10* (2006.01)
*B32B 17/00* (2006.01)
*B32B 38/18* (2006.01)
*C04B 37/04* (2006.01)
*B32B 37/10* (2006.01)
*B32B 38/00* (2006.01)

(56) References Cited

U.S. PATENT DOCUMENTS

| | | | |
|---|---|---|---|
| 2006/0063351 A1* | 3/2006 | Jain | G02F 1/1362 |
| | | | 438/455 |
| 2006/0125879 A1* | 6/2006 | Fujii | B41J 2/14274 |
| | | | 347/54 |
| 2006/0228824 A1 | 10/2006 | Sueyoshi | |
| 2010/0226030 A1 | 9/2010 | Baldus et al. | |
| 2010/0246189 A1 | 9/2010 | Heitmann | |
| 2012/0145667 A1* | 6/2012 | Imbert | H03H 3/02 |
| | | | 216/34 |
| 2015/0104618 A1* | 4/2015 | Hayashi | C03B 23/0252 |
| | | | 428/174 |

FOREIGN PATENT DOCUMENTS

| | | |
|---|---|---|
| DE | 102009011863 A1 | 9/2010 |
| DE | 102011087323 A1 | 12/2012 |
| DE | 102012204833 A1 | 2/2013 |
| GB | 2377907 A | 1/2003 |
| JP | 2006181906 * | 7/2006 |
| JP | 2006181906 A | 7/2006 |
| WO | 8504133 A1 | 9/1985 |
| WO | 9207715 A1 | 5/1992 |

OTHER PUBLICATIONS

Espacenet English-language abstract for DE 10200243 (2003).
Espacenet English-language abstract for DE 102011087323 (2012).
Espacenet English-language abstract for DE 102012204833 (2013).

* cited by examiner

SOLID BODY JOINING OF A CARRIER BODY AND A COVER LAYER, PARTICULARLY BY ANODIC BONDING

BACKGROUND

The invention relates to a method for solid body joining of a carrier body and a cover layer, in particular a method for anodic bonding, wherein the carrier body and the cover layer are connected areally. The invention further relates to a composite component comprising a carrier body and a cover layer, in particular an optical component, for example, a mirror. Applications of the invention are to be found in the manufacturing of composite components, particularly optical components, for example, mirrors for the purposes of optical imaging.

Anodic bonding is a generally known joining process for connecting planar surfaces of, for example, micromechanical components, semiconductor wafers or optical components. By way of example, in DE 10 2009 011 863, an optical mirror comprising a ceramic carrier body with a planar surface and a glass cover layer is disclosed, wherein the glass cover layer is connected by anodic bonding to the surface of the ceramic carrier body. The bond connection is created in that the glass cover layer is placed on the surface of the ceramic carrier body and pressed on in a central region in a locally restricted manner. When an electric potential and heat are applied to the bonding partners, ions, for example, potassium and sodium ions, migrate away from the boundary surface of the glass cover layer and the ceramic carrier body. By this means, a space-charge region is formed so that the mutually adjacent surfaces are attracted to one another until chemical compounds form between the ceramic and the oxygen in the glass cover layer. Starting from the central region, a bond front forms on all sides migrating to the edge of the mutually adjacent surfaces until the cover layer is firmly bound areally to the carrier body. Gaseous reaction products which can arise during the production of the bond connection at the bond front escape between the as yet unconnected surfaces toward their edge.

The conventional method has the advantage that mirrors are prepared which, due to the ceramic carrier body, have a high level of stiffness and mechanical stability and, due to the glass cover layer, have a smooth surface which can be made with optical quality. However, a disadvantage is that the bond front can migrate unevenly, so that gaps can form in the connection. A further disadvantage is that the conventional technique is restricted to anodic bonding of planar surfaces. However, there exists an interest in manufacturing mirrors with curved reflector surfaces, in particular mirrors with aspherical reflector surfaces, for example, for applications in space, for telescopes and in lithography.

Aspherical mirrors have conventionally been manufactured by mechanical processing (grinding, lapping and polishing) of a glass body. However, aspherical glass bodies have limited stability, in particular with large mirror diameters in the range of, for example, 10 cm to 20 cm, so that they are unsuitable for use under thermal or mechanical loading, particularly in space.

The following attempts at manufacturing curved mirrors with improved stability are known from practical applications. It has been proposed to apply a coating on a ceramic carrier body with a curved carrier body surface, for example a glass cover layer, by means of sputtering. However, this approach has the disadvantage that the thickness of a layer deposited by coating, for example, by sputtering or CVD is limited under practical process conditions. The low achievable thickness means that a subsequent mechanical processing of, for example, a glass, silicon or SiC cover layer which are applied by sputtering or CVD, for example, to construct an aspherical surface form, is possible to only a limited extent. Furthermore, the roughness of the ceramic carrier body is transferred to the surface of the cover layer and thus also influences the achievable optical quality.

A further proposal is based on connection by optical contact bonding, wherein surfaces are connected by molecular attraction forces. With the aid of optical contact bonding, joining is possible also on curved surfaces on provision of the required surface quality with regard to roughness and, in particular, accuracy of shape (DE 10200243 A1). However, the stability of the connection of parts joined by optical contact bonding is strongly dependent on the respective coefficients of expansion of the bonding partners and the associated permissible temperature of the surroundings. Furthermore, the connection by optical contact bonding is very susceptible to liquids and sealing is always necessary in order to prevent untimely detachment. These connections are also subject to mechanical instability (vibration drift). This can be reduced but not suppressed by means of plasma pre-treatment of the bonding partners since optical contact bonding does not lead to a positive substance bonded joint. Use in an environment with severe temperature variations and/or high mechanical loading (shock) is therefore precluded.

The stated problems occur not only during the manufacturing of composite components for optical tasks by means of anodic bonding. Other solid body joining processes such as glass-ceramic-metal soldering, diffusion welding or nanostructured bonding are restricted to the joining of planar surfaces as well.

It is an objective of the invention to provide an improved method for solid body joining of a carrier body and a cover layer, by which the disadvantages of conventional techniques can be overcome. The method should be usable, in particular, for areal, interruption-free connection of curved surfaces, for example, spherical or aspherical surfaces. It is a further objective of the invention to provide an improved composite component, in particular for optical purposes, with which disadvantages of conventional composite components are overcome. The composite component should be characterized, in particular, by an areal, interruption-free connection between mutually adjacent curved surfaces.

These objectives are achieved by means of a method for solid body joining, in particular for anodic bonding, and a composite component having the features of the independent claims. Advantageous embodiments and applications of the invention are disclosed in the dependent claims.

SUMMARY OF THE INVENTION

According to a first general aspect of the invention, the above objective is achieved by a method for solid body joining of a carrier body and a cover layer, particularly by anodic bonding, wherein the cover layer is pressed with a pressing force against a curved carrier body surface. According to the invention, a multidirectionally distributed pressing force is generated with which the cover layer is pressed areally against the curved carrier body surface. The pressing force is simultaneously applied distributed with a pressure intermediary device over the entire cover layer during the solid body joining. The pressure intermediary device acts through direct contact on the entire cover layer, the pressing force being directed in all sections of the cover layer perpendicularly to the local form of the carrier body surface.

Under the effect of the pressing force, the cover layer is laid along the curved carrier body surface so that a cover layer surface and the carrier body surface make full contact. According to the invention, the pressing force is applied such that the shape of the cover layer surface is matched to the shape of the carrier body surface.

According to the invention, the carrier body surface has a curvature which is selected depending on the actual use of the carrier body. The curvature includes a shape of the carrier body which deviates from a planar form. In cross-sections perpendicular to the main extent of the carrier body, the carrier body surface has a curved, preferably stepless contour. The shape of the carrier body surface and of the cover layer connected to the carrier body can be, for example, entirely concave or entirely convex or in sections, respectively, concave and convex. Advantageously, for the first time with the invention, a stable, gap-free joining region with a curvature is provided. With conventional joining processes, in particular with conventional anodic bonding, this has not been possible since the process conditions of these methods were limited to the joining of planar surface.

The multidirectionally distributed pressing force acts on a free surface of the cover layer. The expression "free surface of the cover layer" denotes a surface of the cover layer opposing the cover layer surface, which is to be connected to the carrier body surface. The free surface of the cover layer is preferably uncoated and, in the finished composite component, uncovered. Alternatively, it can have a coating, for example, an electrical contact layer comprising, for example, a silver-containing conductive paint (conducting silver) for anodic bonding or a functional layer comprising, for example, an antireflection layer in the finished composite component. The multidirectional distribution of the pressing force means, in particular that, during the solid body joining, when the cover layer lies on the carrier body surface, the pressing force is directed, at each site of the free surface of the cover layer, perpendicularly to the local extent of the free surface of the cover layer. The pressing force acts, in particular, like a hydrostatic or pneumatic pressure in a normal direction onto the cover layer.

Advantageously, by means of the application of the areally distributed pressing force to the cover layer, the restrictions of conventional techniques for the solid body joining of planar surfaces can be overcome. Between the cover layer and carrier body surfaces which face toward one another, a gap-free mechanical material contact is created which enables the formation of a laminar, gap-free connection between the cover layer and the carrier body by means of the respective joining process used. By way of deviation, particularly from conventional anodic bonding, no locally restricted pressing force is exerted, but rather, even simultaneous pressing on of the surfaces of the bonding partners is brought about. A moving bonding front is avoided so that the joining creates an even (homogeneous) joining region between the bonding partners.

According to a second general aspect of the invention, the aforementioned objective is achieved by means of a composite component comprising a carrier body and a cover layer, wherein a curved areal joining region is formed between a cover layer surface and a curved carrier body surface. According to the invention, the joining region is formed between the cover layer surface and the carrier body surface, uniformly over their extent. The joining region is the material transition between the carrier body and the cover layer and is formed through a solid body joining method, for example, by anodic bonding. The cover layer is gaplessly and materially joined to the carrier body surface facing toward the cover layer. Advantageously, the composite component according to the invention is distinguished by an improved temperature stability and mechanical stability. The invention enables the use of conventional solid body methods without limitation with regard to the method parameters, such as temperature, pressure or electrical potentials.

The carrier body is a solid body with at least one curved carrier body surface to which the cover layer is bonded. The size and shape of the carrier body is selected depending on the use of the composite component. The carrier body can be made of a uniform material or of a plurality of materials. In the latter case, the carrier body can be made of a basic material, for example, ceramic, and a coating of the carrier body surface, for example, a metallic coating. The cover layer is a solid body with an areal extent. Preferably, in the case of solid body joining, the cover layer has a constant thickness over the extent thereof. Following the solid body joining, the cover layer can be mechanically processed so that a thickness which varies over its extent results.

The carrier body can optionally be bonded at a further curved or planar carrier body surface with a second cover layer (counterbonding). The further carrier body surface is preferably arranged opposing the first curved carrier body surface. The second cover layer can be fixed by solid body joining, chronologically before or after or simultaneously with the cover layer on the first curved carrier body surface. The second cover layer preferably has the same materials and the same thickness as the first cover layer on the first curved carrier body surface.

Advantageously, different variants are available for applying the pressing force to the cover layer. According to a first, preferred embodiment of the invention, the pressing force is generated through a combination of a pressing piston and the pressure intermediary device. The pressure intermediary device distributes a force from the pressing piston acting on the cover layer, so that it acts on the cover layer in a normal direction. In this embodiment of the invention, the pressure intermediary device comprises a deformable layer of a flowable solid or liquid material. When the force is applied between the pressing piston on one side and the arrangement consisting of the cover layer and the carrier body on the other side, the deformable layer is pressed with the pressing piston against the free surface of the cover layer. The flowable material becomes distributed like a hydraulic fluid which acts on the cover layer and provides the exactly fitting contact of the cover layer and carrier body surfaces which face one another. Advantageously, the pressure intermediary device permits less demanding requirements to be placed on the fit of the pressing piston to the form of the carrier body surface. With one single pressing piston, the pressing force can be applied to differently formed carrier body surfaces.

It has proved to be particularly advantageous if the flowable material is a particulate material, for example, a layer with a large number of layers of spherical ceramics particles, a liquid, for example an oil, or a deformable solid material, for example, a plastically or elastically deformable plastics mat, in particular a silicone mat. These flowable materials simplify the provision of the deformable layer and its adaptation to different forms of the carrier body. Spherical ceramics particles have the additional advantage that, if needed, they facilitate evacuation of the structure made of the carrier body and the cover layer. Furthermore, the deformable layer of the flowable material can be connected, for example, in the form of the plastics mat or a plastics cushion filled with oil, to the pressing piston. In this case, the arrangement of the pressing piston and the exerting of the pressing force is simplified.

According to a second embodiment of the invention, the pressing force is generated by means of an ambient pressure, in particular the atmospheric pressure under normal conditions, or by an air pressure which is elevated relative to atmospheric pressure. In this embodiment, the pressure intermediary device comprises a gaseous material on which the ambient pressure acts and which covers the cover layer. With an underpressure device, the pressure between the cover layer and the carrier body relative to the ambient pressure is reduced so that the cover layer is pressed against the carrier body by means of the ambient pressure.

The carrier body and the cover layer are generally made of different materials which, in the event of mutual contacting, in particular under the effects of pressure, temperature and/or electrical current, form a joint connection. Particular advantages are provided if the carrier body is made of a ceramics material, the carrier body surface of which contains Si, for example, SiSiC ceramic or a ceramic with an Si layer, and the cover layer is made of an Na-based glass, for example, borosilicate glass. Advantageously, in this case, the composite component according to the invention combines the mechanical stability of SiSiC (silicon carbide that has been infiltrated by silicon) with the processing capability and surface quality of the glass cover layer. This material combination is also particularly well suited to the use of anodic bonding.

Furthermore, it has proved to be advantageous that the glass cover layer can be prepared with a thickness which permits distortion under the effect of the pressing force and subsequent processing of the composite component for providing a surface contour of the cover layer. The thickness of the glass cover layer is selected to be, for example, in the region of 500 μm to 3 mm.

Advantageously, according to a further embodiment of the invention, the cover layer can be heated before and during the solid body joining, so that it is plastically deformable. By this means, adaptation of the cover layer surface to the carrier body surface is facilitated. If the cover layer is manufactured from Na-based glass, the cover layer is preferably heated to a temperature above the glass transition temperature ($T_G$). In the case of cover layers made of other materials, the glass transition temperature is also generally known as the glass temperature. In the case of a cover layer made of borosilicate glass, $T_G$ is, for example 530° C.

According to a particularly preferred embodiment of the invention, the carrier body surface has a spherical curvature. By means of the pressing force exerted according to the invention, the whole cover layer is pressed onto the carrier body locally perpendicularly to the form of the carrier body surface. The composite component is created with the spherically curved surface.

According to a further advantageous variant of the invention, following the solid body joining of the cover layer to the carrier body, mechanical processing of the free surface of the cover layer is provided. According to this embodiment of the invention, the composite component has a free surface of the cover layer the form of which deviates from the surface contour of the carrier body surface. As distinct from conventional methods, wherein a glass layer is sputtered onto a ceramic body, the cover layer enables shaping, for example, by grinding, lapping and/or polishing. By means of the mechanical processing, the form of the free surface of the cover layer can be selected depending on the actual use of the composite component. Furthermore, possible traces of the action of the pressing force, for example, traces of a flowable particulate material can be remedied.

According to a particularly preferred application of the invention, the composite component is an optical component, in particular a mirror. In this case, it can be provided, for example, that the carrier body has a spherical curvature and that, with the mechanical processing of the free surface of the cover layer, an aspherical curvature or a spherical curvature with a larger radius of curvature relative to the carrier body is manufactured.

Advantageously, the invention can be realized with different methods for solid body joining. The term "solid body joining" is generally intended to denote the bonding of the cover layer and the carrier body such that between the two bonding partners a material connection (solid body joining), in particular covalent bonding, is provided between the atoms of the cover layer and of the carrier body. The solid body joining method can comprise, for example, diffusion welding or soldering wherein surfaces of the cover layer and the carrier body which contact one another undergo a material connection under the effect of pressure and temperature and possibly a solder.

According to a preferred and particularly advantageous application of the invention, the solid body joining method comprises anodic bonding of the cover layer to the carrier body. The composite component is characterized in this case by a joining region in the form of a bond connection between the cover layer and the carrier body. The bond connection has an ion concentration gradient which extends between the cover layer and the carrier body across the border area between them.

During anodic bonding, gaseous reaction products can arise. The gaseous reaction products can flow away between the cover layer and the carrier body to the edge of the mutually adjacent surfaces. According to an advantageous embodiment of the invention, a surface treatment of the carrier body can be provided in order to promote an absorption of the gaseous reaction products and/or the flowing away of the gaseous reaction products into the surroundings of the composite component. The surface treatment can comprise, for example, roughening of the carrier body surface, in particular by etching. Advantageously, by means of the roughening, microscopically small channels are created which do not impair the bond connection between the cover layer and the carrier body, but which absorb the gaseous reaction products and/or and conduct them to the edge of the surfaces. Alternatively, the surface treatment can comprise depositing a gas absorption layer, in particular made of $SiO_2$. $SiO_2$ has proved to be advantageous since this material does not impair the anodic bonding and simultaneously has a sufficiently high capacity for the accommodation of gaseous reaction products.

BRIEF DESCRIPTION OF THE DRAWINGS

Further advantages and details of the invention will now be described making reference to the accompanying drawings, in which show in.

DETAILED DESCRIPTION OF PREFERRED EMBODIMENTS

Reference is made below to variants of the invention wherein a cover layer is bonded by anodic bonding to a curved carrier body. It should be noted that the invention is usable accordingly for the bonding of a cover layer to a carrier body with other solid body joining methods, for example, diffusion welding or soldering. Furthermore, reference is made to the solid body joining of a ceramic carrier body with a glass cover layer. However, the implementation of the invention is not restricted to these materials, but rather is possible with other material combinations which are suitable as bonding partners for solid body joining, for example, glass-ceramic-metal soldering, diffusion welding or nanostructured bonding. Details of anodic joining are not given below insofar as they are per se known from the prior art. Bonding parameters can be selected depending on the concrete application of the invention wherein anodic bonding can preferably take place at a raised temperature, for example at 500° C., in a vacuum, in an inert protective gas or at atmospheric pressure.

Figure 1:
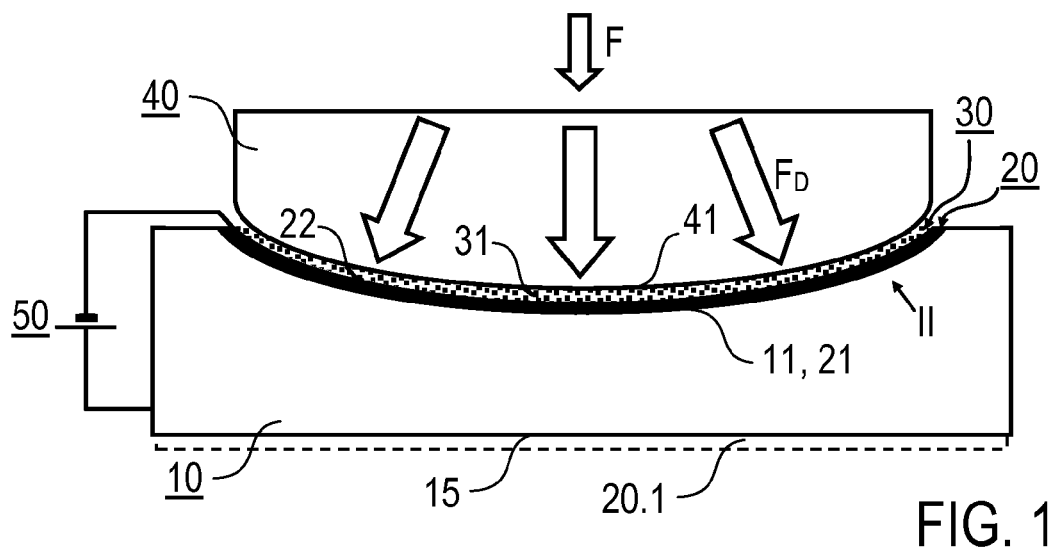
FIG. 1 a schematic illustration of the manufacturing of a concave composite component.

FIG. 1 illustrates, in a schematic sectional representation, the solid body joining of a carrier body 10 with a cover layer 20 by means of anodic bonding. Further details of the method are described making reference to FIG. 4.

The carrier body 10, which is made of SiSiC, has the shape of a plate, the main extent of which is perpendicular to the drawing plane. The plate has the shape of a straight circular cylinder with a diameter of, for example, 20 cm and a height of, for example, 4 cm. At an end face of the circular cylinder (in FIG. 1, at the upper side of the carrier body 10), a concave carrier body surface 11 with a spherical curvature is provided. The radius of curvature of the carrier body surface 11 is, for example, 180 mm.

The cover layer 20 which is to be bonded to the carrier body 10 is a pre-manufactured borosilicate glass cover layer with a thickness of, for example, 1.5 mm to 1.8 mm. The cover layer 20 is provided in a preparation step (see FIG. 4, S5) with a curvature which is adapted to the spherical curvature of the carrier body surface 11. Microscopic fitting of the carrier body surface 11 and the adjacent cover layer surface 21 such that areal anodic bonding is enabled without additional measures is, however, not provided for reasons of production technology. Whereas during anodic bonding between planar surfaces of the bonding partners with available measures, sufficient planarity of the mutually adjacent surfaces is provided, with curved surfaces, slight deviations from the, for example, spherical surface contour has negative effects on the mutual fitting.

The cover layer surface 21 facing toward the carrier body surface 11 is uncoated whereas the opposing free surface 22 of the cover layer 20 carries an electrical contact layer of conducting silver. The thickness of the contact layer is, for example, 100 μm.

For the placement of the cover layer surface 21 onto the carrier body surface 11 and to overcome the manufacturing-related lack of fit, the cover layer 20 is pressed with a pressing piston 40 against the carrier body 10. The pressing piston 40 has a piston surface 41 with a shape which is adapted to the spherical shape of the cover layer and the carrier body surface 11, but does not have to match them exactly. The pressing piston 40 is arranged in order to generate a pressing force which is produced through the gravitational force F (the weight of the pressing piston 40 and/or an additional mass) or an additional drive (not shown).

For the multidirectional distribution of the pressing force $F_D$ onto the cover layer 20, a pressure intermediary device 30 in the form of a layer of particulate material 31 is arranged between the piston surface 41 and the free surface 22 of the cover layer 20. The particulate material 31 comprises a powder, for example, of ceramic spheres, in particular of $Al_2O_3$, with a diameter of 500 μm. The thickness of the layer of particulate material is, for example, 20 mm. When the force F is applied to the pressing piston 40, the particulate material 31 is able to flow like a fluid so that the pressing force $F_D$ is exerted in the normal direction of the cover layer 20 and the carrier body surface 11. The particulate material 31 accommodates mismatches (form deviations) between the cover layer surface 21 and the carrier body surface 11. The cover layer 20 is pressed against the carrier body 10, so that the cover layer surface 21 touches the carrier body surface 11 areally and without interruption. In order to facilitate the adaptation of the cover layer 20 to the carrier body 10 by means of plastic deformability of the cover layer 20, the temperature of the carrier body 10 and of the cover layer 20 is set, for example, to 650° C.

While the pressing force is applied with the pressing piston 40 onto the cover layer 20, the anodic bonding takes place. The electrical contact layer on the free surface 22 of the cover layer 20 and the carrier body 10 are connected in a per se known manner to a voltage source 50 (bonding potential, for example, 800 V). As distinct from conventional anodic bonding with a bond front moving from a central region outwardly, in the method according to the invention, the simultaneous bonding of the bonding partners takes place along the entire mutually adjacent surfaces 11, 21. During anodic bonding, gaseous reaction products, for example, oxygen or hydrogen arise. In order to facilitate the flowing away of the reaction products to the edge, the carrier body surface 11 is preferably roughened, as shown schematically in the enlarged representation in FIG. 2 (see arrow II in FIG. 1).

FIG. 1 shows schematically an optionally provided second cover layer 20.1 (shown dashed), which can be bonded to an opposing carrier body surface 15. The second cover layer 20.1 can be bonded to the second carrier body surface 15 by means of the same method for solid body joining, for example, anodic bonding, or by a different method for solid body joining, as compared with the cover layer 20.

Figure 2:
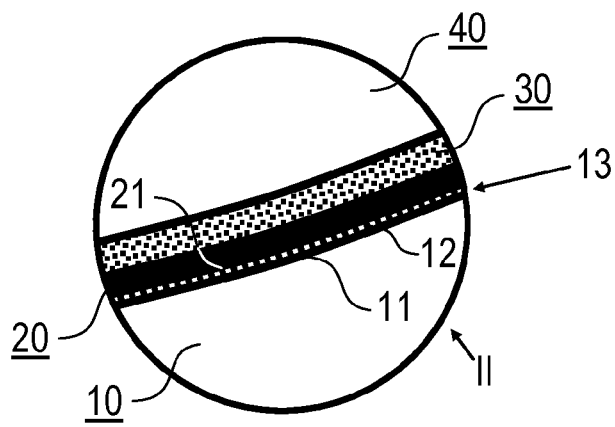
FIG. 2 an enlarged representation of a section of FIG. 1.

FIG. 2 illustrates, by way of a section, the carrier body 10 with the carrier body surface 11, the cover layer 20 with the cover layer surface 21, the pressure intermediary device 30 and the pressing piston 40. The carrier body surface 11 is subjected to a surface treatment, for example, by etching with HF acid, RIE or ion beams in order to generate a microscopically rough structure 12. The rough structure 12 does not impair the anodic bonding of the bonding partners, but permits the passage of the gaseous reaction products. Alternatively, in place of the rough structure 12, an $SiO_2$ gas absorption layer having a thickness of, for example, 40 nm to 100 nm can be provided. The $SiO_2$ gas absorption layer is generated, for example, by coating or in that the carrier body surface 11 is roughened in a dry etching system so that a roughness of, for example, 20 nm is created and $SiO_2$ is subsequently sputtered on.

During anodic bonding of the carrier body 10 to the cover layer 20, a joining region 13 is formed on the mutually contacting surfaces 11, 21. The joining region 13 is characterized, in the case of a bond connection, by a concentration gradient of Na and K ions perpendicularly to the surfaces 11, 21. The joining region 13 is not impaired by the rough structure 12. The pressure intermediary device 30 has the effect that the joining region 13 is simultaneously formed along the extent of the surfaces 11, 21. Since the same reaction conditions prevail in all sections of the surfaces 11, 21, the joining region 13 is homogeneous along the extent of the surfaces 11, 21.

Figure 3:
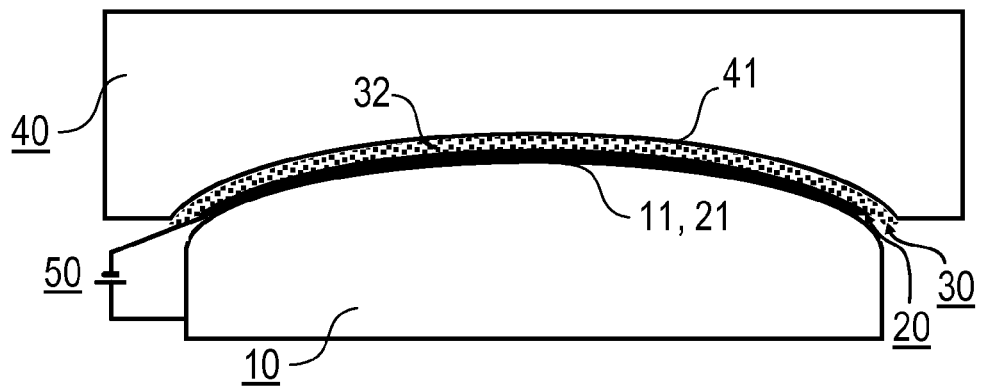
FIG. 3 a schematic illustration of the manufacturing of a convex composite component.

FIG. 3 illustrates, in a schematic sectional representation, the anodic bonding of a cover layer 20 and a carrier body 10 to a convex carrier body surface 11. In this case, the pressing force is applied onto the cover layer 20 with a pressing piston 40 which has a concave piston surface 41 and a pressure intermediary device 30 in the form of a flexible mat 32. Under the effect of the multidirectionally distributed pressing force, the cover layer and carrier body surfaces 21, 11 facing one another contact one another areally and without interruption. The anodic bonding takes place while the cover layer 20 is pressed against the carrier body 10 by applying an electrical potential from a voltage source 50 to both bonding partners, said voltage source being connected to an electrically conductive contact layer on the cover layer 20 and to the carrier body 10.

Figure 4:
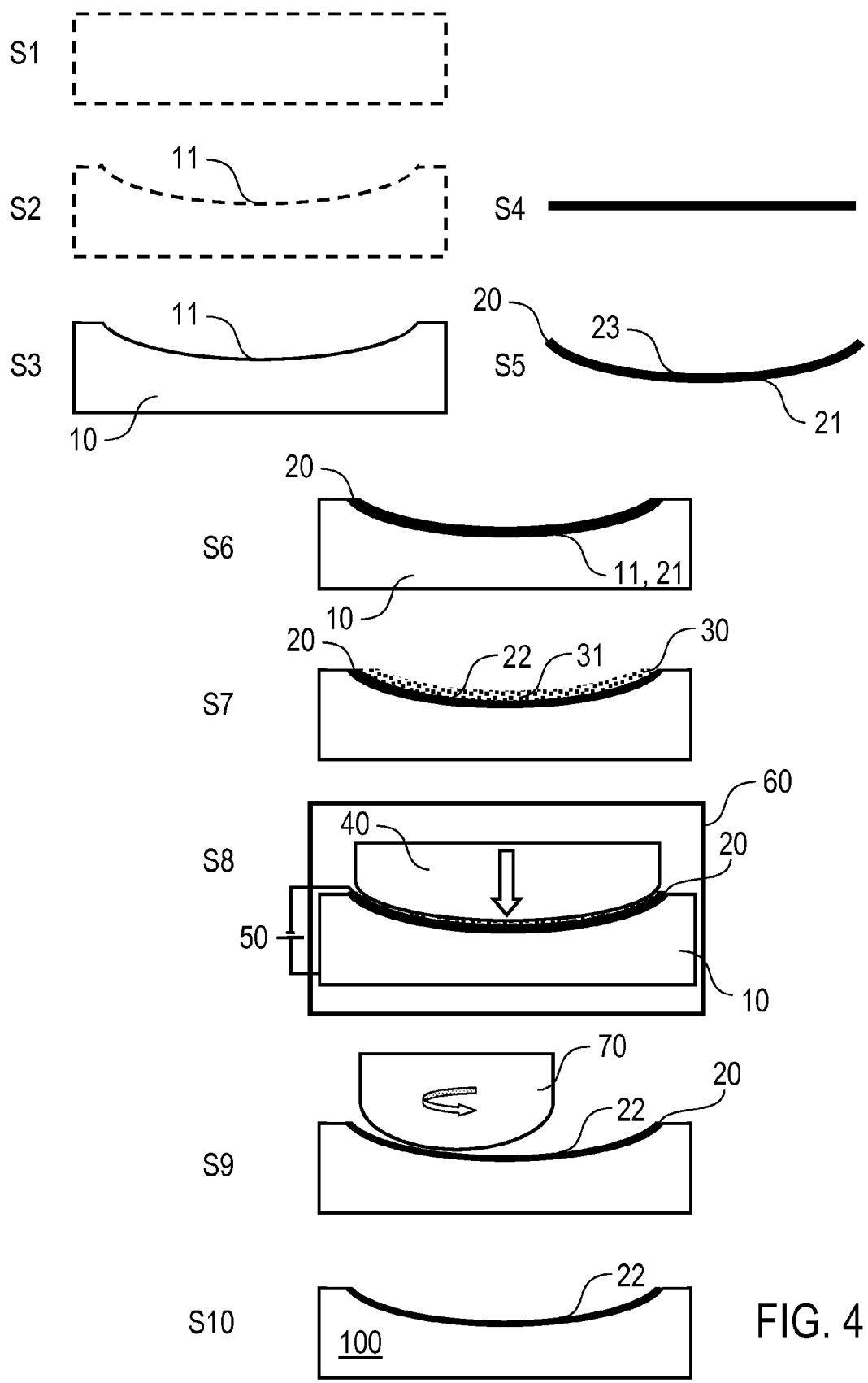
FIG. 4 further details and features of preferred embodiments of the method according to the invention.

FIG. 4 shows further details of the method for manufacturing a composite component 100 in the form of a mirror. Firstly, in preparation steps S1 to S5, the carrier body 10 is prepared with the curved carrier body surface 11 and the curved cover layer 20 is prepared with the cover layer surface 21.

In order to manufacture the carrier body 10, initially at step S1, the provision of a ceramics body in the form of a straight circular cylinder and, in step S2, the forming of the concave carrier body surface 11 are carried out. Steps S1 and S2 take place during the green treatment with the dried but not yet sintered ceramics material. Subsequently, at step S3, the sintering of the ceramics and the production of the carrier body 10 take place, wherein finishing of the form of the carrier body surface 11, for example, by CNC grinding and polishing and possibly surface treatment of the carrier body surface 11 are provided in order to form the structure 12 (see FIG. 2). The surface treatment comprises, for example, etching with HF acid or the deposition of an $SiO_2$ layer.

In steps S4 and S5, in order to provide the cover layer 20, initially a planar blank for the cover layer is cut to size (step S4). Subsequently, the blank is heated to adapt to the concave form of the carrier body surface 11 and is bent by deep drawing and subsequently provided with a conductive contact layer 23 (step S5). As an alternative to deep drawing, mechanical grinding of the cover layer 20 from a blank of sufficient thickness can be provided.

Subsequently, the pre-prepared bonding partners of carrier body 10 and cover layer 20 are placed together (step S6). The bent cover layer 20 is placed with the convex cover layer surface 21 against the concave carrier body surface 11 adjacent to the carrier body 10. Subsequently, in step S7, the pressure intermediary device 30 is arranged on the free surface 22 of the cover layer 20. For this purpose, for example, an even layer of the flowable particulate material 31 is distributed over the cover layer 20.

The pressing of the cover layer 20 onto the carrier body 10 and the anodic bonding of both the bonding partners with the pressing piston 40 is carried out in a bonding furnace 60 which is shown schematically in step S8. The bonding furnace 60 can be operated evacuated if required. The temperature in the bonding furnace 60 is above the glass transition temperature of the cover layer 20 (e.g. 530° C.) and is, for example, up to 600° C.

Following the anodic bonding, at step S9, mechanical processing of the free surface 22 of the cover layer 20 with a grinding tool 70 (shown schematically) takes place outside the bonding furnace. The mechanical processing comprises, for example, the formation of an aspherical curvature of the free surface 22, wherein the thickness of the cover layer in its center is reduced, for example, to 300 µm. The mechanical processing also comprises lapping and polishing of the free surface 22. As a result, at step S10, the finished composite component 100 is provided in the form of a mirror with a polished surface 23, for example, with a roughness in the range of 0.1 nm to 0.3 nm.

If, at step S3, the optional surface treatment of the carrier body surface 11 is provided, at step S9, sealing of any exposed parts of the carrier body surface 11 can additionally be provided, for example, by applying a cover lacquer. By this means, moisture unintentionally penetrating through the generated micro-roughness into the joining region between the carrier body 10 and the cover layer 20 is prevented.

The composite component 100 comprises, for example, a mirror for use in a telescope or in space, for example, for imaging purposes.

Figure 5:
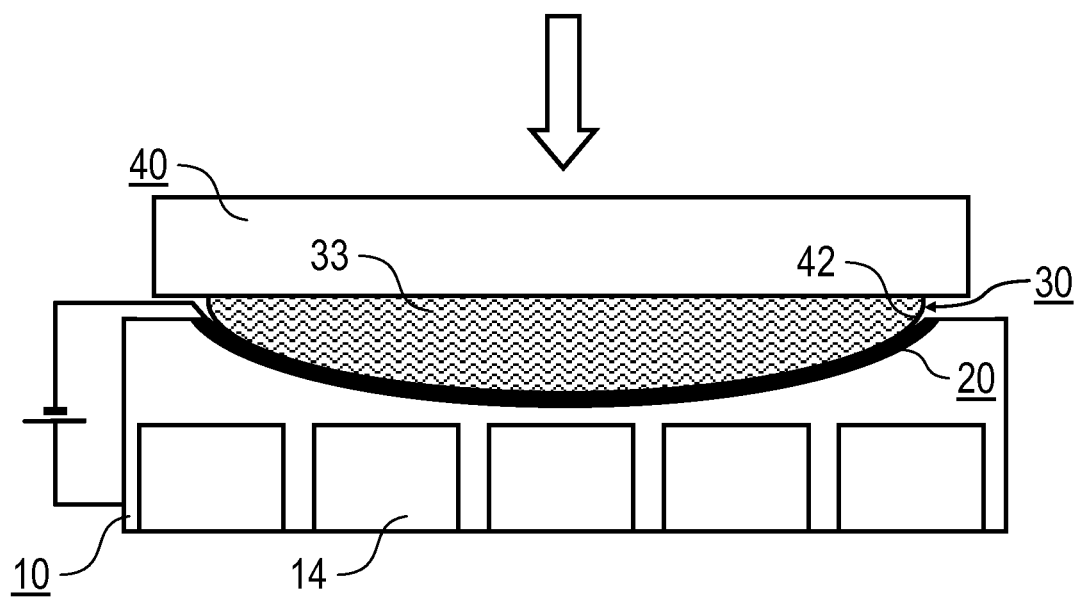
FIG. 5 a schematic representation of features of further advantageous embodiments of the invention.

Similarly to FIG. 1, FIG. 5 shows further features of the invention which can be provided individually or in combination during the manufacturing of the bond connection or in the composite component 100. According to FIG. 5, a cushion-shaped pressure intermediary device 30 comprising a fluid 33 in a foil envelope 42 is provided, in order to transfer the pressing force from the pressing piston 40 onto the cover layer 20. Furthermore, it is shown by way of example in FIG. 5 that the carrier body 10 can have a lightweight structure in that hollow spaces 14 are formed in the carrier body 10.

The features of the invention disclosed in the present description, the drawings and the claims can be significant either individually or in combination for the realization of the invention in its various embodiments.

What is claimed is:

1. A method for anodic bonding of a carrier body and a cover layer,
   the cover layer is pressed with a pressing force against a carrier body surface,
   the carrier body surface has a curvature,
   the cover layer is joined to the carrier body with anodic bonding,
   the pressing force being created with a pressing piston during the anodic bonding is distributed by way of a pressure intermediary device areally and simultaneously over the whole cover layer and is directed perpendicularly to the curvature of the carrier body surface, and
   the pressure intermediary device comprises a deformable layer of a particulate material which is arranged between the pressing piston and the cover layer and is pressed with the pressing piston against the cover layer.

2. The method according to claim 1, wherein
   the particulate material comprises ceramics spheres.

3. The method according to claim 1, wherein
   the pressing force is generated by way of an ambient pressure, and
   the pressure intermediary device comprises a gaseous material on which the ambient pressure acts and which covers the cover layer.

4. The method according to claim 1, wherein
   the carrier body is made of a ceramics material, the carrier body surface of which contains silicon, and the cover layer is made of an Na-based glass.

5. The method according to claim 1, comprising the step
heating the cover layer so that the cover layer is plastically deformable.

6. The method according to claim 1, wherein
the carrier body surface has a spherical curvature.

7. The method according to claim 1, comprising at least one of the steps
mechanically processing a free surface of the cover layer, and
solid body joining of the carrier body and a further cover layer, which is connected to a further carrier body surface of the carrier body.

8. The method according to claim 7, wherein
the carrier body surface is provided with a spherical curvature, and
the free surface of the cover layer is manufactured with an aspherical curvature by way of mechanical processing.

9. The method according to claim 1, comprising the step
surface treatment of the carrier body surface such that gaseous reaction products of the anodic bonding are absorbed at the carrier body surface or are conducted into a surroundings of the carrier body and the cover layer.

10. The method according to claim 9, wherein the surface treatment of the carrier body surface comprises
roughening of the carrier body surface by etching, or
deposition of a gas absorption layer.

11. The method according to claim 10, wherein the gas absorption layer is made of SiO2.

* * * * *